(12) United States Patent
Matsumoto et al.

(10) Patent No.: US 6,456,317 B1
(45) Date of Patent: Sep. 24, 2002

(54) ENDOSCOPIC APPARATUS

(75) Inventors: Kanichi Matsumoto, Hino; Katsuyuki Saito, Sagamihara; Makoto Tsunakawa, Toda; Akihiko Mochida, Hino; Kotaro Ogasawara, Tokyo; Shinji Yamashita, Fuchu; Noboru Kusamura, Hachioji; Wataru Ohno, Sagamihara; Kuniaki Kami, Machida; Hideki Tashiro, Yokohama, all of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/198,850

(22) Filed: Nov. 24, 1998

(30) Foreign Application Priority Data

Dec. 3, 1997 (JP) .............................................. 9-333217

(51) Int. Cl.[7] .............................. H04N 3/18; H04N 9/47
(52) U.S. Cl. ......................................... 348/68; 600/101
(58) Field of Search .............................. 348/45, 65, 68, 348/69, 70, 71, 77, 362, 366, 370; 600/101, 109, 160, 178, 176, 181; H04N 7/18, 9/47

(56) References Cited

U.S. PATENT DOCUMENTS

| | | | |
|---|---|---|---|
| 4,704,520 A | * 11/1987 | Kanno et al. | 250/205 |
| 4,945,366 A | * 7/1990 | Hisamichi et al. | 396/17 |
| 5,408,263 A | * 4/1995 | Kikuchi et al. | 348/68 |
| 5,517,242 A | 5/1996 | Yamada et al. | |
| 5,638,119 A | 6/1997 | Cornuejols | 348/229 |
| 6,278,490 B1 | * 8/2001 | Fukuda et al. | 348/362 |

FOREIGN PATENT DOCUMENTS

| | | |
|---|---|---|
| DE | 3436057 | 5/1985 |
| JP | 57-39673 | 3/1982 |
| JP | 4-196776 | 7/1992 |
| JP | 5-153473 | 6/1993 |
| JP | 6-141229 | 5/1994 |

* cited by examiner

Primary Examiner—Nhon Diep
(74) Attorney, Agent, or Firm—Ostrolenk, Faber, Gerb & Soffen, LLP (57) ABSTRACT

In an endoscopic apparatus, when the dynamic range expansion on/off switch is turned on, a CPU changes a switch from one contact over to another. Red, green, and blue digital signals sent from a knee and gamma circuit are output to respective dynamic range expanding circuits. Thus, the dynamic ranges for the digital signals are expanded. On the other hand, when the CPU changes another switch from one contact over to the other, a light adjustment signal output from an operational amplifier is then driven to a level causing a diaphragm in a light source unit to open further. Consequently, an increased amount of illumination light is supplied to the incident end of a light guide running through an endoscope. Thus, when a dynamic range is expanded, a halation effect will not occur in imaging of an object located at a point near the distal end of the endoscope. Moreover, insufficiency of illumination light will not occur in the imaging of an object located at a point far from the endoscope distal end. The dynamic range can therefore be expanded efficiently. An endoscopic image of the interior of a body cavity can be viewed with the body cavity set to a desired brightness level all points ranging from a near point to a far point within the body cavity.

6 Claims, 7 Drawing Sheets

ENDOSCOPIC APPARATUS

BACKGROUND OF THE INVENTION

1. Field of the Invention

The present invention relates to an endoscopic apparatus which makes it possible to expand a dynamic range thereof to obtain an image signal more efficiently.

2. Description of the Related Art

For observing the interior of a body cavity, medical-purpose endoscopes are employed. Since the interior of a body cavity is dark, lighting equipment is needed. In an electronic endoscope or an endoscopic apparatus employing an endoscope mountable camera, if the illumination is too bright, a halation effect occurs. On the if other hand the illumination is too dark, it is difficult to observe the image. These effects are attributable to the dynamic range of a solid-state imaging device such as a CCD.

In general, an effective luminance range available for imaging by an imaging apparatus such as a TV camera is defined uniquely by the photoelectric conversion characteristic of an imaging device, for example, a solid-state imaging device. In other words, the lower limit of the voltage levels of the outputs of the imaging device is restricted by a noise level. On the other hand, the upper limit thereof is restricted by a saturation value. A usable operating range of voltage levels is thus defined. Moreover, a characteristic curve indicating the voltage levels of the outputs of the solid-state imaging device has a slope retained at a certain value. The effective luminance range available for imaging by the solid-state imaging device is therefore defined uniquely.

For example, Japanese Unexamined Patent Publication No. 57-39673 has proposed an imaging apparatus that synthesizes image signals produced with an object set to two different brightness levels so as to expand the dynamic range of a solid-state imaging device for an image signal.

However, when an endoscope is used for imaging, illumination is needed to observe the interior of a body cavity. The interior of a body cavity contains moistened surfaces having numerous irregularities. For this reason, if the dynamic range is to narrow, a halation effect occurs in imaging an object located at a near point because of too bright illumination. Moreover, an object located at a far point cannot be imaged. As disclosed in the prior art, therefore, an apparatus for synthesizing image signals produced with an object set to two different brightness levels so as to expand the dynamic range of a solid-state imaging device for an image signal is employed. Even when this apparatus is employed in an electronic endoscope or an endoscopic apparatus including an endoscope mountable camera, the apparatus of the prior art does not take into account the effect of the lighting equipment used for illuminating the object. Even if the dynamic range were expanded, there would arise a problem in that an object located at a far point cannot be imaged because of an insufficient amount of light.

SUMMARY OF THE INVENTION

An object of the present invention is to provide an endoscopic apparatus which makes it possible to view an endoscopic image which depicts the interior of a body cavity while keeping the interior at a given brightness level at all points ranging from a near point to a far point in the body cavity, but bringing about neither a halation effect when the imaged point in the body cavity is located at a near point nor an insufficient amount of light when the imaged point is located at a far point.

Moreover, another object of the present invention is to provide an endoscopic apparatus which makes it possible to expand a dynamic range thereof and successfully view an object image which depicts the interior of a body cavity at all points ranging from a near point in to a far point the body cavity.

Still another object of the present invention is to provide an endoscopic apparatus capable of preventing occurrence of an insufficient amount of light especially when an object is located at a far point, while making it possible to expand the dynamic range, and to successfully observe the object located at the far point.

An endoscopic apparatus includes an endoscope, a light source unit, a signal processing unit, a light adjustment signal producing unit, and an amount-of-light control unit. The endoscope is inserted into a body cavity and has an imaging device, which images an object in the body cavity, incorporated therein or mounted thereon. The light source unit supplies illumination light to the endoscope. The signal processing unit processes an image signal sent from the imaging device of the endoscope, and synthesizes images projected during different exposure times so as to expand the dynamic range of the imaging device. The light adjustment signal producing unit produces a light adjustment signal. When the signal processing unit expands the dynamic range of the imaging device, the light adjustment signal causes an amount of light emanating from the light source unit and falling on the imaging device to increase compared with an amount of light employed in a normal state. The amount-of-light control unit controls an amount of illumination light emanating from the light source unit according to the light adjustment signal sent from the light adjustment signal producing unit.

Moreover, the endoscopic apparatus of the present invention may include an endoscope, a light source unit, and a signal processing unit. The endoscope is inserted into a body cavity and has an imaging device, which images an object in the body cavity, incorporated therein or mounted thereon. The light source unit supplies illumination light to the endoscope whereby an amount of illumination light to be supplied to the endoscope is controlled according to a light adjustment signal. The signal processing unit processes an image signal sent from the imaging device in the endoscope. Moreover, the signal processing unit synthesizes images projected during two different exposure times to thus expand the dynamic range of the imaging device. The signal processing unit produces a light adjustment signal that causes an amount of light falling on the imaging device to increase when the dynamic range is expanded as compared with an amount of light falling thereon in a normal state.

BRIEF DESCRIPTION OF THE INVENTION

DESCRIPTION OF THE PREFERRED EMBODIMENTS

Referring to the drawings, embodiments of the present invention will be described below.

Figure 1:
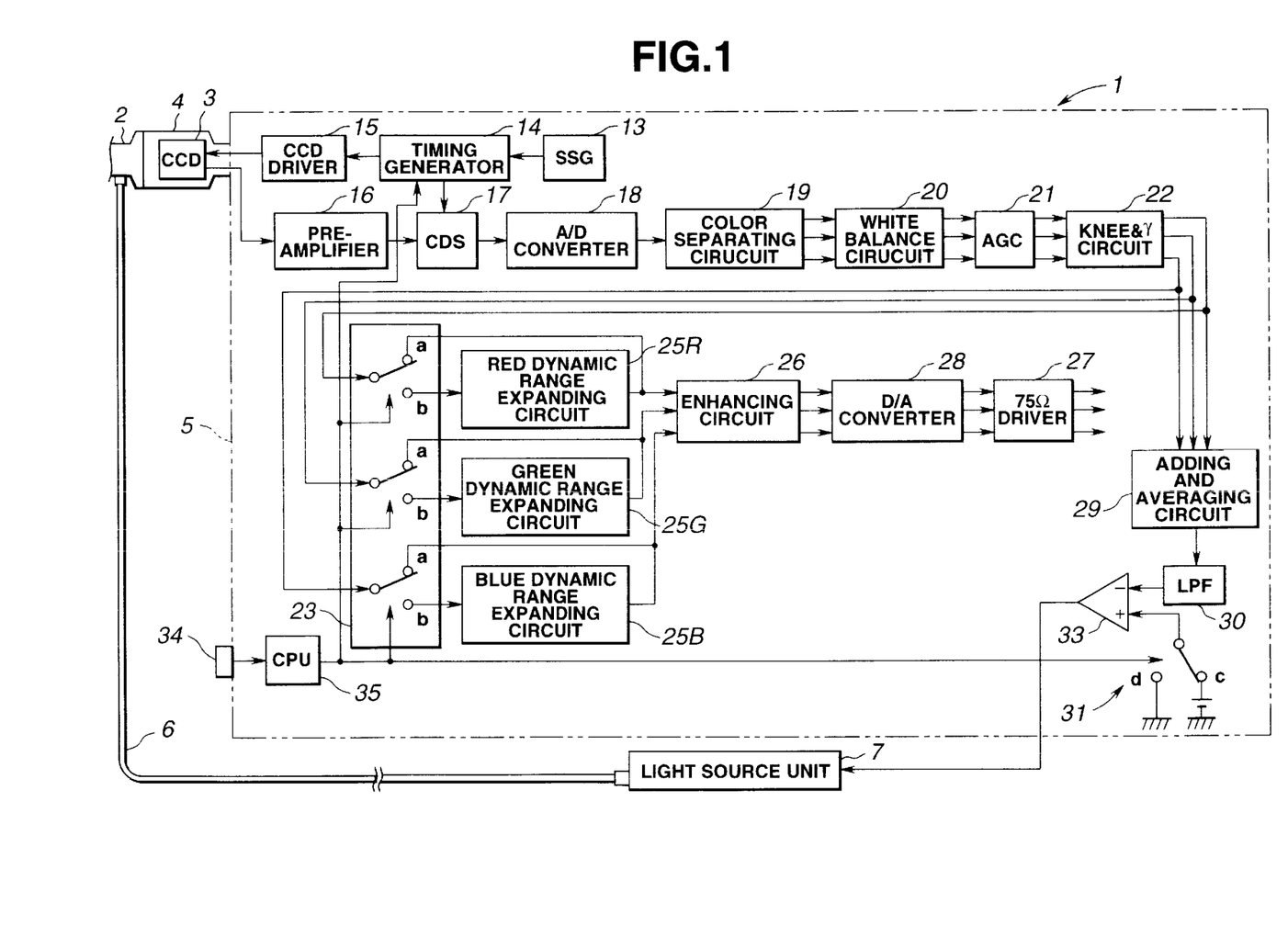
FIG. 1 is a diagram showing a configuration of an endoscopic apparatus in accordance with a first embodiment of the present invention.
Figure 2:
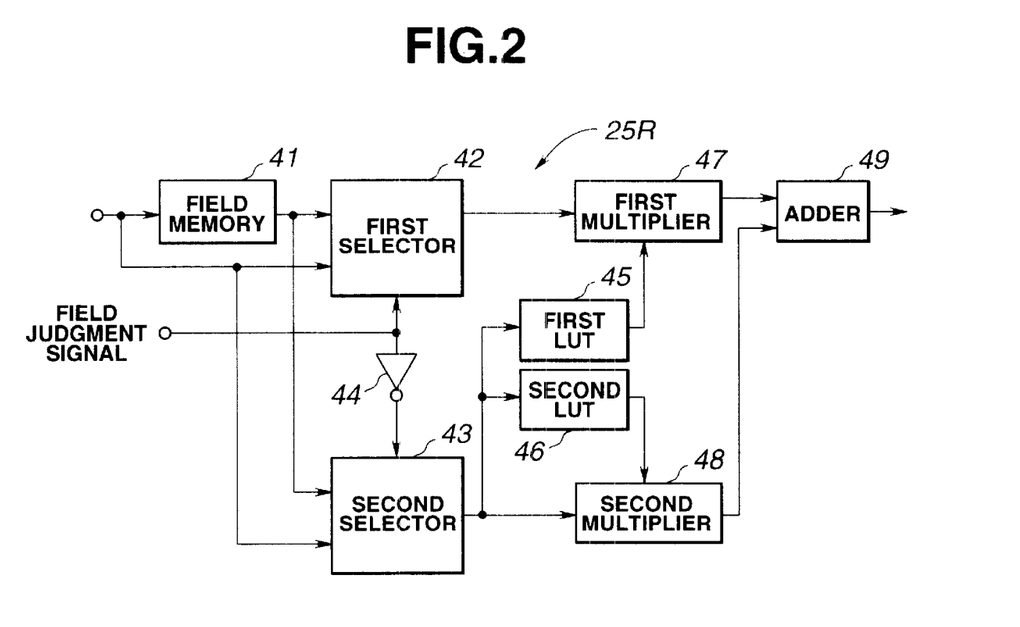
FIG. 2 is a diagram showing a configuration of the red dynamic range expanding circuit shown in FIG. 1.
Figure 3:
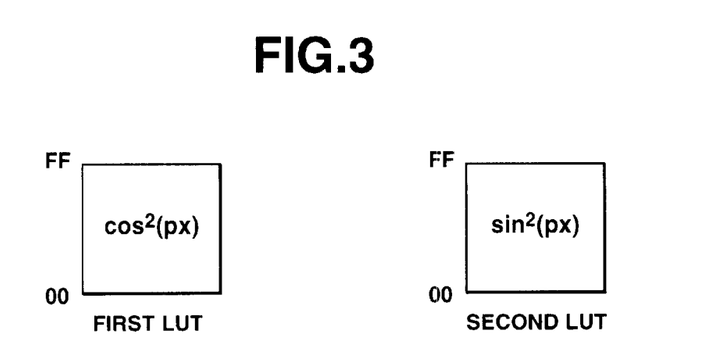
FIG. 3 is the diagram showing a mapping for the first look-up table and second look-up table shown in FIG. 2.
Figure 4:
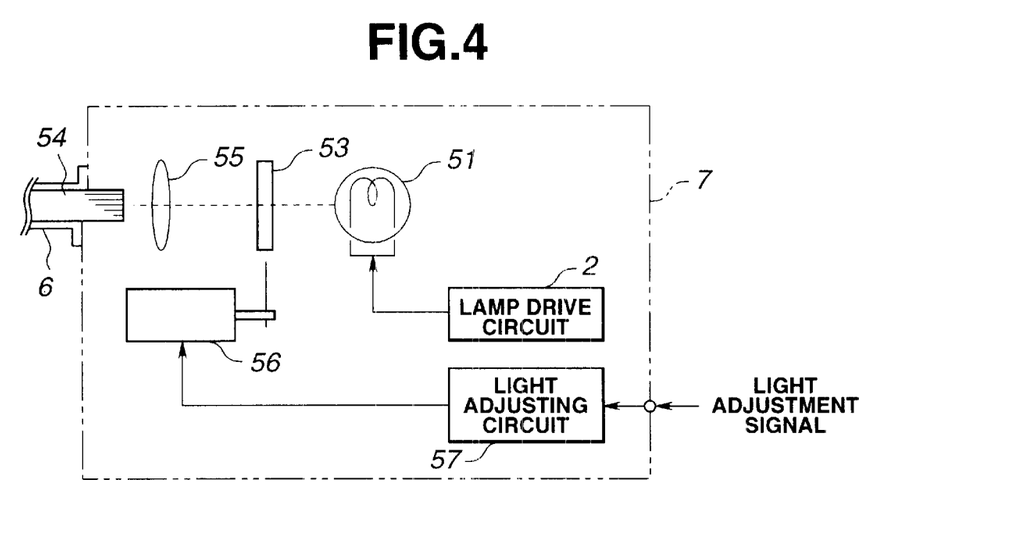
FIG. 4 is a diagram showing a configuration of the light source unit shown in FIG. 1.
Figure 5:
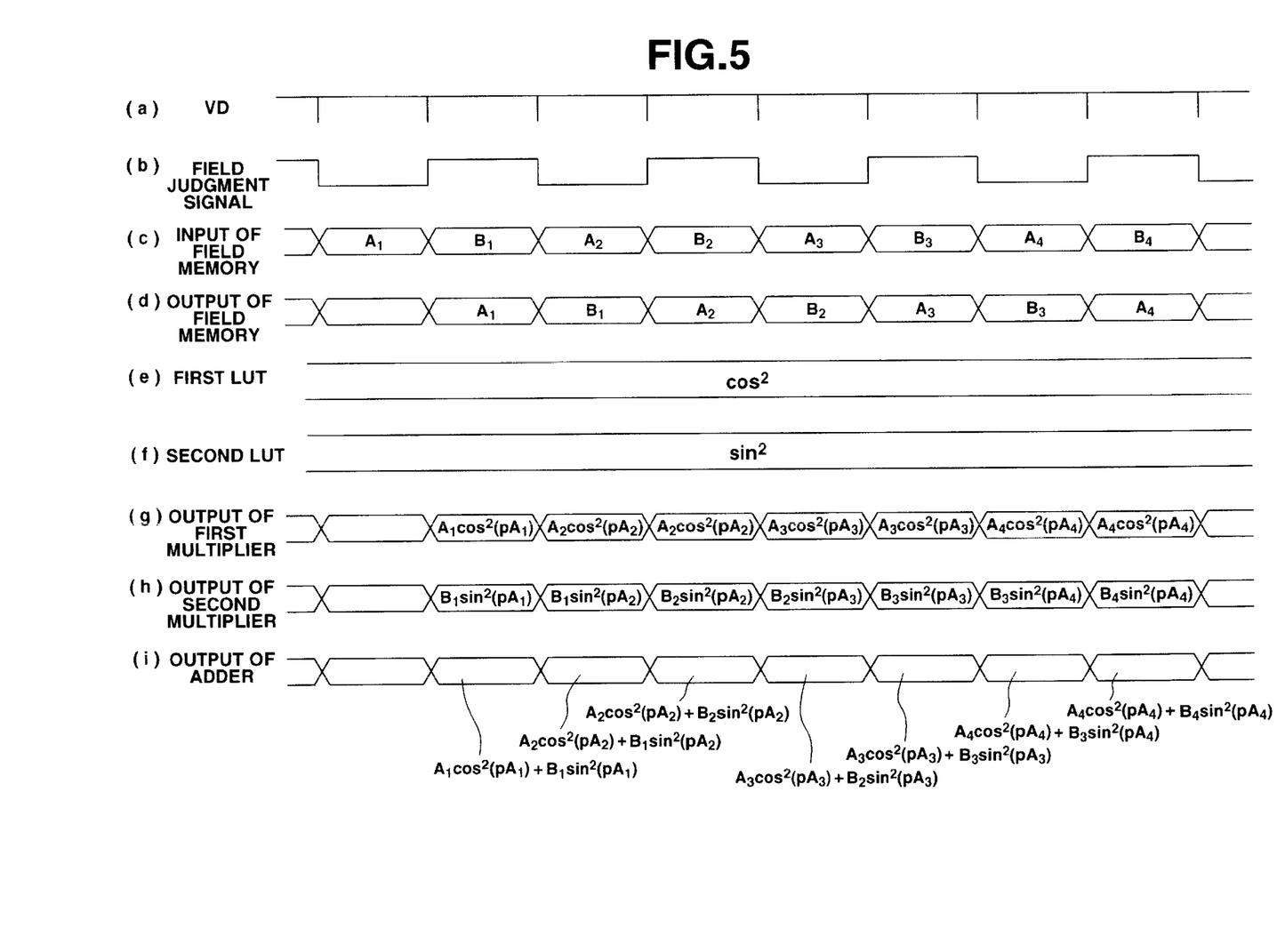
FIG. 5 is a timing chart indicating the timing of each signal produced by the red dynamic range expanding circuit shown in FIG. 2.
Figure 6:
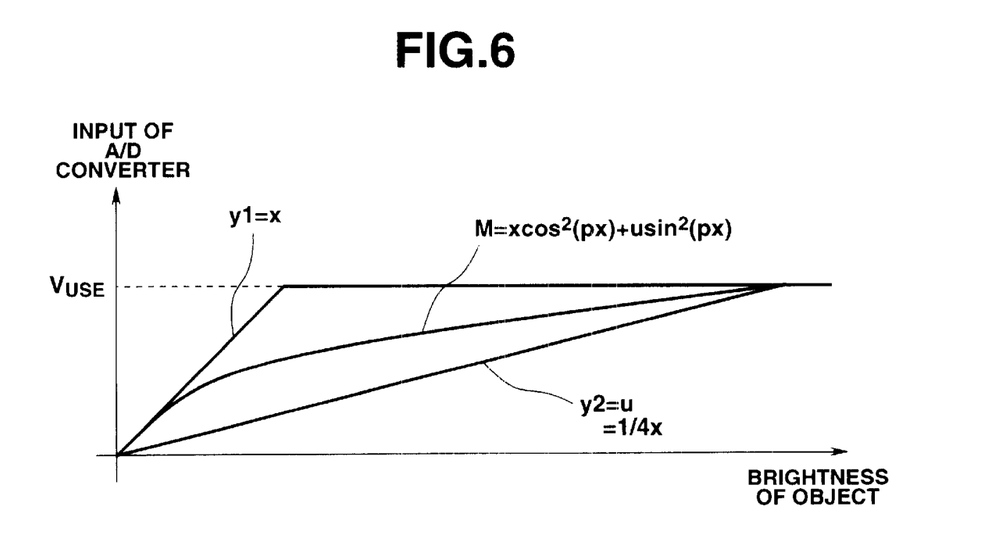
FIG. 6 is an explanatory diagram for explaining the operations of the red dynamic range expanding circuit shown in FIG. 2.
Figure 7:
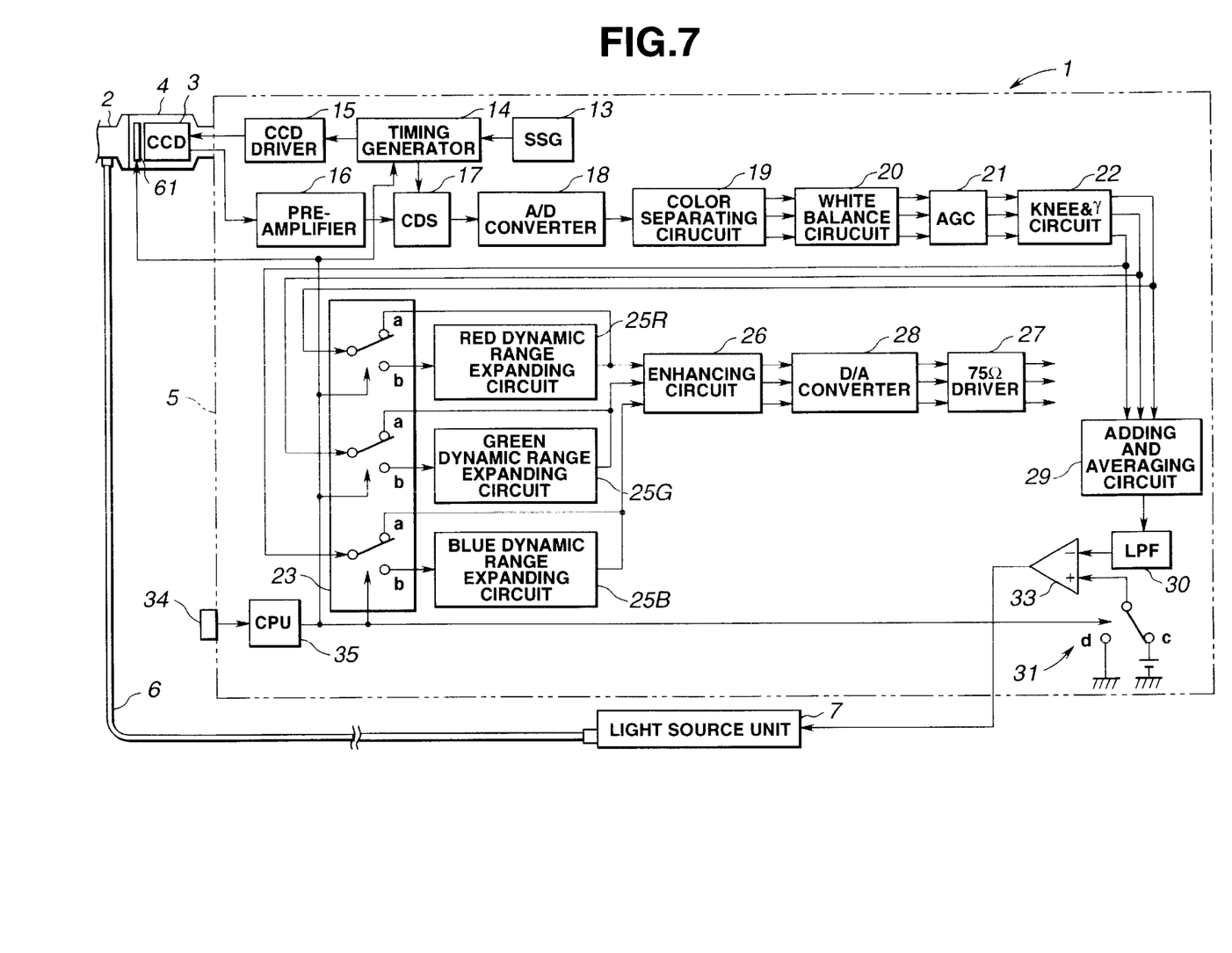
FIG. 7 is a diagram showing a configuration of a variant of the endoscopic apparatus shown in FIG. 1.

FIGS. 1 to 7 relate to a first embodiment of the present invention. FIG. 1 is a diagram showing a configuration of an endoscopic apparatus. FIG. 2 is a diagram showing a configuration of the red dynamic range expanding circuit shown in FIG. 1. FIG. 3 is a diagram showing a mapping operation for the first look-up table and second look-up table shown in FIG. 2. FIG. 4 is a diagram showing a configuration of the light source unit shown in FIG. 1. FIG. 5 is a timing chart indicating the timing of each signal produced by the red dynamic range expanding circuit shown in FIG. 2. FIG. 6 is an explanatory diagram for explaining the operations of the red dynamic range expanding circuit shown in FIG. 2. FIG. 7 is a diagram showing a configuration of a variant of the endoscopic apparatus shown in FIG. 1.

As shown in FIG. 1, the endoscopic apparatus 1 of this embodiment include an endoscope 2, a mountable TV camera 4, a camera control unit (hereinafter CCU) 5, and a light source unit 7. The endoscope is inserted into a body cavity for observing an object. The mountable TV camera 4 is provided with a CCD 3 that is a single-plate color imaging device. The CCD 3 is freely detachably attached to the eyepiece unit of the endoscope 2 and projects an object image formed by the endoscope. The camera control unit (CCU) 5 controls driving of the CCD 3 included in the mountable TV camera 4 and processes an image signal sent from the CCD 3 so that the object image can be displayed on a monitor which is not shown. The light source unit 7 supplies illumination light to the endoscope 2 over a universal cable 6 that extends from the endoscope 2 and is freely detachably attached to the light source unit 7.

The CCU 5 includes a sync signal generating circuit (hereinafter SSG) 13, a timing generator 14, and a CCD driver 15. The sync signal generating circuit 13 generates a reference signal. The timing generator 14 inputs the reference signal from the SSG 13 and produces a driving signal used to drive the CCD 3. The CCD driver 15 drives the CCD 3 in response to the driving signal sent from the timing generator 14.

Moreover, the CCU 5 includes a preamplifier 16, a CDS circuit 17, and an A/D converter 18. The preamplifier 16 amplifies an image signal sent from the CCD 3. The CDS circuit 17 carries out correlative double sampling (hereinafter abbreviated to CDS) according to sampled pulses sent from the timing generator 14. The A/D converter 18 converts an output of the CDS circuit 17 from an analog form to a digital form. After an image signal output from the CCD 3 is amplified by the preamplifier 16, the frequency of the image signal is lowered to fall within the baseband by means of the CDS circuit 17. The resultant signal is then converted into a digital signal by the A/D converter 18.

Furthermore, the CCU 5 includes a color separating circuit 19, a white balance circuit 20, an automatic gain control circuit (hereinafter AGC circuit) 21, a knee and gamma circuit 22, an enhancing circuit 26, and a D/A converter 28. The color separating circuit 19 separates three color signal components of red, green, and blue from a signal digitized by the A/D converter 18. The white balance circuit 20 adjusts a white balance in a color image represented by each of the digital color signals separated by the color separating circuit 19. The automatic gain control circuit 21 controls the gain of each of the digital color signals that have been subjected to white balance adjustment by means of the white balance circuit 20. The knee and gamma circuit 22 processes the knee of a curve plotted according to each of the digital color signals whose gains have been controlled by the AGC circuit 21. The knee and gamma circuit 22 corrects a gamma in each of the color images represented by the digital color signals. The enhancing circuit 26 enhances the digital color signals of red, green, and blue that have been subjected to knee processing and gamma correction by means of the knee and gamma circuit 22 and that are sent via a switch 23. The D/A converter 28 converts the enhanced digital signals into analog signals and outputs the analog signals to a monitor, not shown, via a 75 Ω driver 27.

Moreover, the CCU 5 includes an adding and averaging circuit 29, an operational amplifier 33, and a CPU 35. The adding and averaging circuit 29 averages the red, green, and blue digital signals that have been subjected to knee processing and gamma correction by means of the knee and gamma circuit 22. The operational amplifier 33 inputs an output of the adding and averaging circuit 29 via a low-pass filter (LPF) 30, and amplifies a difference voltage between the output and a reference voltage Vref input through a switch 31. The operational amplifier 33 then outputs the difference voltage as a light adjustment signal to the light source unit 7 which supplies illumination light to the endoscope 2. The CPU 35 receives an input from a dynamic range expansion on/off switch 34 that is formed on the face of the apparatus 1 and used to instruct expansion of dynamic range. The CPU 35 controls switching by the switch 23 and switch 31 and also controls the timing of a driving signal generated by the timing generator 14.

Now, assume that the dynamic range expansion on/off switch 34 is turned on. The switches constituting the switch 23 are changed from connecting to the contacts a over to the contacts b. Red, green, and blue digital signals that have been subjected to knee processing and gamma correction by means of the knee and gamma circuit 22 are input to a red dynamic range expanding circuit 25R, a green dynamic range expanding circuit 25G, and a blue dynamic range expanding circuit 25B, respectively, via the switch 23. The red dynamic range expanding circuit 25R, green dynamic range expanding circuit 25G, and blue dynamic range expanding circuit 25B each expand the dynamic range for a color signal. In this case, the enhancing circuit 26 enhances the red, green, and blue digital signals that have been processed to expand the dynamic ranges therefor by the red dynamic range expanding circuit 15R, green dynamic range expanding circuit 15G, and blue dynamic range expanding circuit 15B respectively.

The red dynamic range expanding circuit 25R is, as shown in FIG. 2, composed of a field memory 41, a first selector 42 and a second selector 43. In the field memory 41, a red digital signal having been subjected to knee processing and gamma correction by means of the knee and gamma circuit 22 and representing the image of one field is stored. The first selector 42 and second selector 43 each switch a red signal stored in the field memory 41 and a red signal representing the image of a current field according to a field judgment signal sent from the timing generator 14. The second selector 43 outputs a red signal representing the image of a field which is different from the image of current field represented by the red signal output from the first selector 42 due to the presence of an inverter circuit 44.

Moreover, the red dynamic range expanding circuit 25R includes a first look-up table (hereinafter first LUT) 45 and second look-up table (hereinafter second LUT) 46, a first multiplier 47, a second multiplier 48, and an adder 49. The first LUT 45 and second LUT 46 are each referenced to retrieve a given value of a function, which will be described later, in relation to a voltage level of a component of a red signal output from the second selector 43 which renders a pixel. The first multiplier 47 multiplies a component of a red signal output from the first selector 42 which renders a pixel by an output of the first LUT 45. The second multiplier 48 multiplies a component of a red signal output from the second selector 43, which renders a pixel by an output of the second LUT 45. The adder 49 adds up the output from the first multiplier 47 and the output from the second multiplier 48, and outputs the sum to the enhancing circuit 26.

The green dynamic range expanding circuit 25G and the blue dynamic range expanding circuit 25B have the same circuitry as the red dynamic range expanding circuit 25R. The description of the green and blue dynamic range expanding circuits will therefore be omitted.

The foregoing first LUT 45 and second LUT 46 are mapped as shown in FIG. 3. Assume that the voltage level of a component of a red signal rendering a pixel is x. The first LUT 45 is referenced to retrieve $\cos^2(px)$. The second LUT 46 is referenced to retrieve $\sin^2(px)$. The symbol p denotes a correction coefficient, for example, $(2\pi/4 \times 4)$.

The light source unit 7 is, as shown in FIG. 4, composed of a lamp 51, a lamp drive circuit 52, a lens 55, a motor 56, and a light adjusting circuit 57. The lamp 51 generates illumination light. The lamp drive circuit 52 drives the lamp 51. The lens 55 converges illumination light emanating from the lamp 51 on an incident end of a light guide 54 via a diaphragm 53 (the light guide 54 runs through the universal cable 6 and endoscope 2 and transmits illumination light to the distal end of the endoscope 2). The motor 56 drives the diaphragm 53. The light adjusting circuit 57 inputs a light adjustment signal from the operational amplifier 33, and controls the diaphragm 53 by way of the motor 56.

Next, the operations of the endoscopic apparatus 1 of the first embodiment having the foregoing components will be described.

In the CCU 5, the CCD driver 15 drives the CCD 3 in the mountable TV camera 4 in response to a driving signal. The driving signal is generated by the timing generator 14 according to a reference signal sent from the SSG 13. A photoelectrically converted signal depicting an object imaged by the CCD 3 is amplified by the preamplifier 16. Thereafter, the frequency of the resultant signal is lowered to fall within the baseband by means of the CDS circuit 17. The signal is then converted into a digital signal by the A/D converter 18.

Thereafter, three color signal components of red, green, and blue are separated from the digitized signal by the color separating circuit 19. The color signals are subjected to white balance adjustment, gain control, and knee processing and gamma correction by means of the white balance circuit 20, AGC circuit 21, and knee and gamma circuit 22 respectively. The resultant color signals are then enhanced by the enhancing circuit 26 via the switch 23, and converted into analog signals by the D/A converter 28. The analog signals are then output to a monitor, which is not shown, via the 75 Ω driver 27.

The red, green, and blue digital signals having been subjected to knee processing and gamma correction by means of the knee and gamma circuit 22 are averaged by the adding and averaging circuit 29. A resultant signal is input to the operational amplifier 33 via the LPF 30. A difference voltage between the resultant signal and a reference voltage Vref input via the switch 31 is amplified by the operational amplifier 33. The resultant signal is output as a light adjustment signal to the light adjusting circuit 57 in the light source unit 7.

Now, assume that the dynamic range expansion on/off switch 34 formed on the face of the apparatus 1 and used to instruct expansion of a dynamic range is turned on. The instruction to expand of the dynamic range is issued to the CPU 35. In response to the instruction, the CPU 35 changes the switches in the switch 23 from the contacts a over to the contacts b. The red, green, and blue digital signals having been subjected to knee processing and gamma correction by means of the knee and gamma circuit 22 are then output to the red dynamic range expanding circuit 25R, green dynamic range expanding circuit 25G, and blue dynamic range expanding circuit 25B respectively. The switch 31 is then changed from a contact c over to a contact d.

When the switch 31 is changed from the contact c over to the contact d, a positive input of the operational amplifier 33 is driven to the ground level. A light adjustment signal output from the operational amplifier 33 exhibits a level causing the diaphragm 53 in the light source unit 7 to open. The light adjustment signal is input to the light adjusting circuit 57 in the light source unit 7. The light adjusting circuit 57 controls driving of the motor 56 and brings the diaphragm 53 to an open state. Consequently, a maximum amount of illumination light emanating from the lamp 51 is supplied to the incident end of the light guide 54, which is running through the endoscope 2, via the lens 55.

Moreover, the timing generator 14 generates a driving signal under the control of the CPU 35. With the driving signal generated by the timing generator 14, the CCD driver 15 drives the CCD 3 so that the CCD 3 will image an object at high shutter speeds that are mutually different shutter speeds associated with different fields. For example, a first shutter speed is 1/60 sec, and a second shutter speed is a quadruple of the first shutter speed (1/240 sec). In other words, an object image rendering field A is projected at the first shutter speed, while an object image rendering field B is projected at the second shutter speed. As will be described later, the red dynamic range expanding circuit 25R, green dynamic range expanding circuit 25G, and blue dynamic range expanding circuit 25B handle the image signals representing the object images projected at the mutually different shutter speeds. The dynamic ranges for red, green, and blue signals are thus expanded.

Next, the details of dynamic range expansion processing performed by the red dynamic range expanding circuit 25R, green dynamic range expanding circuit 25G, and blue dynamic range expanding circuit 25B will be described with reference to the timing chart of FIG. 5. Herein, the red dynamic range expanding circuit 25R will be discussed as an example.

When the dynamic range expansion on/off switch 34 is turned on, the diaphragm 53 is opened. A maximum amount of illumination light is then supplied to the incident end of the light guide 54 running through the endoscope 2. A red digital signal having been subjected to knee processing and gamma correction by means of the knee and gamma circuit 22 is output to the red dynamic range expanding circuit 25R via the switch 23.

A field judgment signal (FIG. 5b) synchronous with a video signal VD (FIG. 5a) is output from the timing generator 14 to the first selector 42 in the red dynamic range expanding circuit 25R. The video signal VD is also output to the second selector 43 therein via the inverter circuit 44.

Moreover, a red signal output from the knee and gamma circuit 42 is input to the field memory 41 (FIG. 5c) in the red dynamic range expanding circuit 25R. The red signal is also applied to one input terminal of each of the first selector 42 and second selector 43 therein. An output of the field memory 41 (FIG. 5d) is applied to the other input terminals of the first selector 42 and second selector 43.

Based on the field judgment signal, a digital signal representing an image of field A projected at the first shutter speed (1/60 sec) is output from the second selector 42. A digital signal representing an image of field B projected at the second shutter speed (1/240 sec) is output from the second selector 43.

The digital signal representing the image of field A is output from the first selector 42 to the adder 49 via the first multiplier 47. On the other hand, the digital signal representing the image of field B is output from the second selector 43 to the first LUT 45 (FIG. 5e), second LUT 46 (FIG. 5f), and second multiplier 48.

At this time, $\cos^2(px)$ is retrieved from the first LUT 45 in relation to the voltage level x of a component of the digital signal representing the image of field A which renders a pixel, and output to the first multiplier 47. The component of the digital signal representing the image of field A, which renders a pixel, is multiplied by the value of $\cos^2(px)$ by means of the first multiplier 47 (FIG. 5g). Moreover, $\sin^2(px)$ is retrieved from the second LUT 46 in relation to the voltage level x of a component of the digital signal representing an image of field A which renders a pixel. The component of the digital signal representing the image of field B, which renders a pixel, is multiplied by the value of $\sin^2(px)$ by means of the second multiplier 48 (FIG. 5h). The adder 49 adds the output of the first multiplier 47 and the output of the second multiplier 48 (FIG. 5i).

In FIG. 5, for the sake of brevity, outputs rendering pixels of fields An are denoted by An, and outputs rendering pixels of fields Bn are denoted by Bn. According to this embodiment, in dynamic range expansion processing, as mentioned above, a signal is handled in units of a component thereof rendering a pixel. Now, the voltage level of a component of a digital signal which renders a pixel of an image of field A shall be x, and the voltage level of a component of a digital signal which renders a pixel of an image of field B shall be u. In this case, the adder 49 provides an output expressed as follows:

$$M = x \cos^2(px) + u \sin^2(px)$$

The green dynamic range expanding circuit 25G and blue dynamic range expanding circuit 25B operate on a signal in the same manner as the red dynamic range expanding circuit 25R. The description of the green and blue dynamic range expanding circuits will therefore be omitted.

According to the first embodiment, for shifting normal observation of a region to be observed in a body cavity to detailed observation, the dynamic range expansion on/off switch 34 is turned on. This causes the diaphragm 53 to open. A maximum amount of light is supplied to the incident end of the light guide 54 running through the endoscope 2. A red digital signal having been subjected to knee processing and gamma correction by means of the knee and gamma circuit 22 is output to the red dynamic range expanding circuit 25R via the switch 23. Now, a digital signal representing an image of field A projected at a first shutter speed (1/60 sec) shall be y1. A digital signal representing an image of field B projected at a second shutter speed (1/240 sec) shall be y2. As shown in FIG. 6, a low-luminance component of the output M of the red dynamic range expanding circuit 25R is dominat in the digital signal, which represents the image of field A projected at the first shutter speed (1/60 sec), when $\cos^2(px)$ is more heavily weighted. On the contrary, when a high-luminance component of the output M thereof is dominat in the digital signal, which represents the image of field B projected at the second shutter speed (1/240 sec), the element $\sin^2(px)$ is more heavily weighted. Consequently, the dynamic range for the red signal can be expanded without deterioration of the signal-to-noise ratio of the low-luminance component. Thus, a maximum amount of illumination light is supplied and the dynamic range for an image signal is expanded. Consequently, an endoscopic image of the interior of a body cavity can be viewed with the body cavity set to a desired brightness level without a halation effect at occuring any point in the body cavity regardless of distance from the distal end of the endoscope.

Moreover, the correction coefficient p should merely be determined properly in relation to the voltage level x of a signal component rendering a pixel. In this way, the output M becomes a function of a brightness level. The function increases continuously and monotonously within a range of brightness levels up to a brightness level that causes a signal produced at the second shutter speed to have a saturation value. A projected image therefore appears uniform and gives no sense of incongruity.

Herein, the correction coefficient p is set to $(2\pi/4 \times 4)$. The correction coefficient p is not limited to this value. Alternatively, the correction coefficient p may be set according to the characteristics of a CCD so that the output M will be a function of the voltage level x of a signal component rendering a pixel which increases monotonously. Moreover, the output M is not limited to the above function, that is, $$x \cos^2(px) + u \sin^2(px)$$

Alternatively, the output M may be any other function of a brightness level. However, the output should have a low-luminance component thereof dominat in a signal produced at a low shutter speed, and have a high-luminance component thereof dominat in a signal produced at a high shutter speed.

In this embodiment, the dynamic ranges for red, green, and blue signals separated by the color separating circuit 9 are expanded using the red dynamic range expanding circuit 25R, green dynamic range expanding circuit 25G, and blue dynamic range expanding circuit 25B respectively. Alternatively, the color separating circuit may be used to separate a luminance signal and chrominance signal. The dynamic range for the luminance signal or chrominance signal or the dynamic ranges for both of them may be expanded.

As shown in FIG. 7, a mountable TV camera 4 may have an iris diaphragm 61 for controlling an amount of incident light illuminated on the CCD 3. In this structure, when the dynamic range expansion on/off switch 34 is turned on, the CPU 35 provides control to open the iris diaphragm 61. Thus, the same operations and advantages as those of the aforesaid embodiment can be exerted.

Moreover, this embodiment has been described by taking an example of imaging an object using the mountable TV camera 4 that is freely detachably attached to the eyepiece unit of the endoscope 2. This embodiment is not limited to this structure. Alternatively, this embodiment can, needless to say, apply to an arrangement in which an electronic endoscope having a CCD incorporated in the distal part of an insertion unit thereof is used to image an object.

Figure 8:
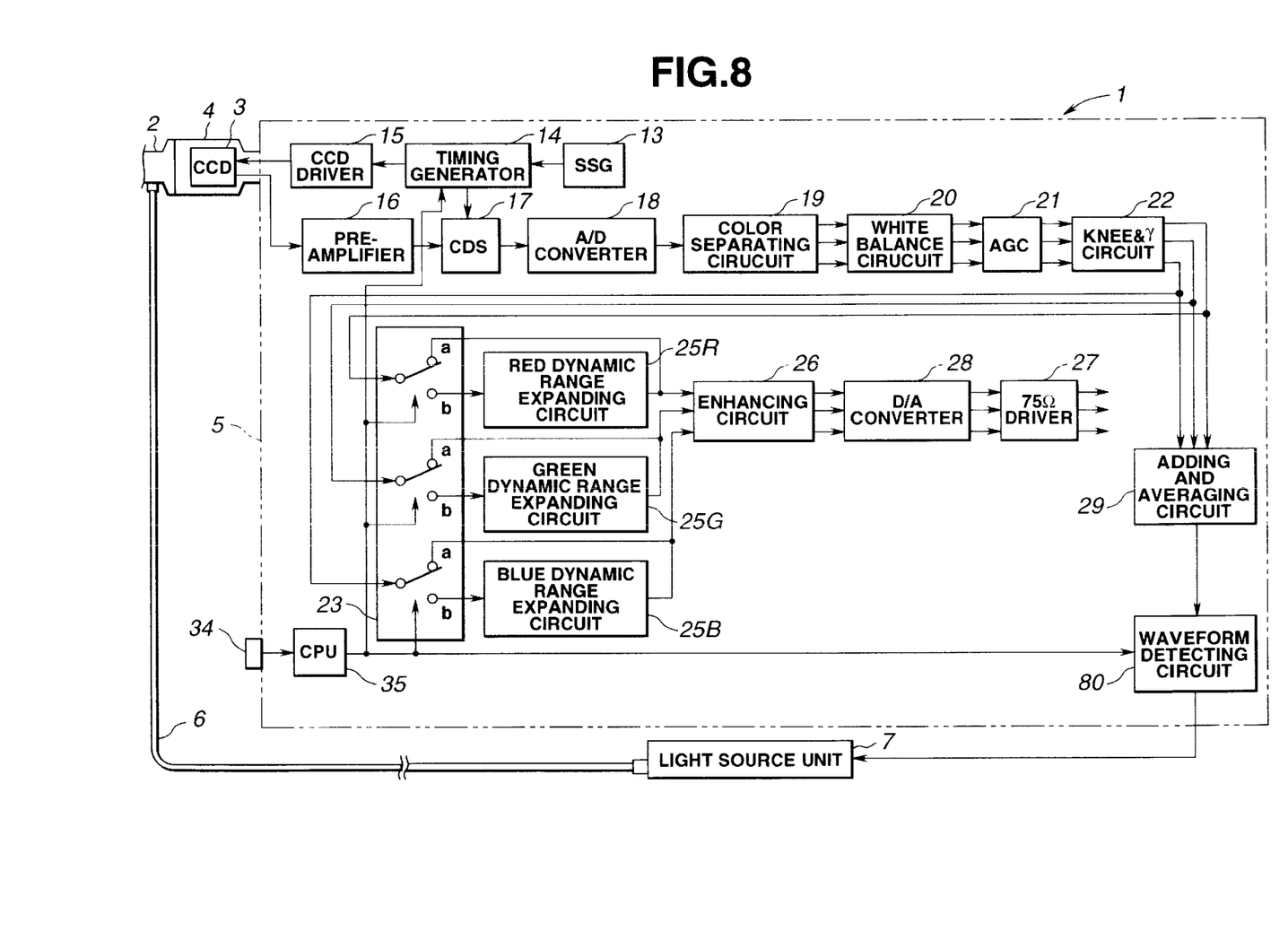
FIG. 8 is a diagram showing a configuration of an endoscopic apparatus in accordance with a second embodiment of the present invention.
Figure 9:
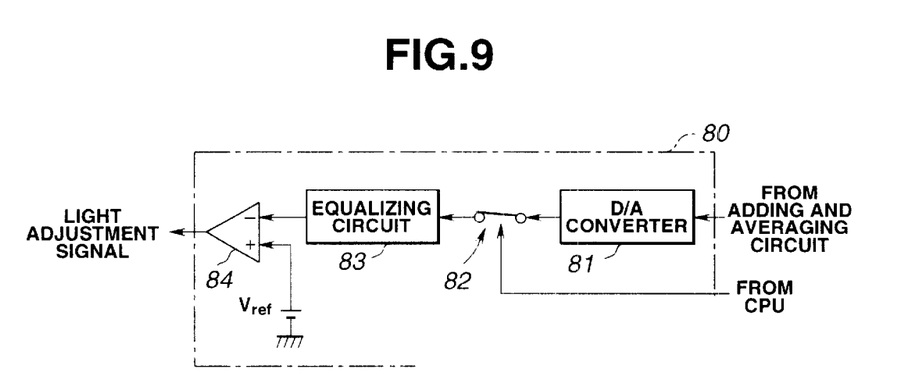
FIG. 9 is a diagram showing a configuration of the waveform detecting circuit shown in FIG. 8.
Figure 10:
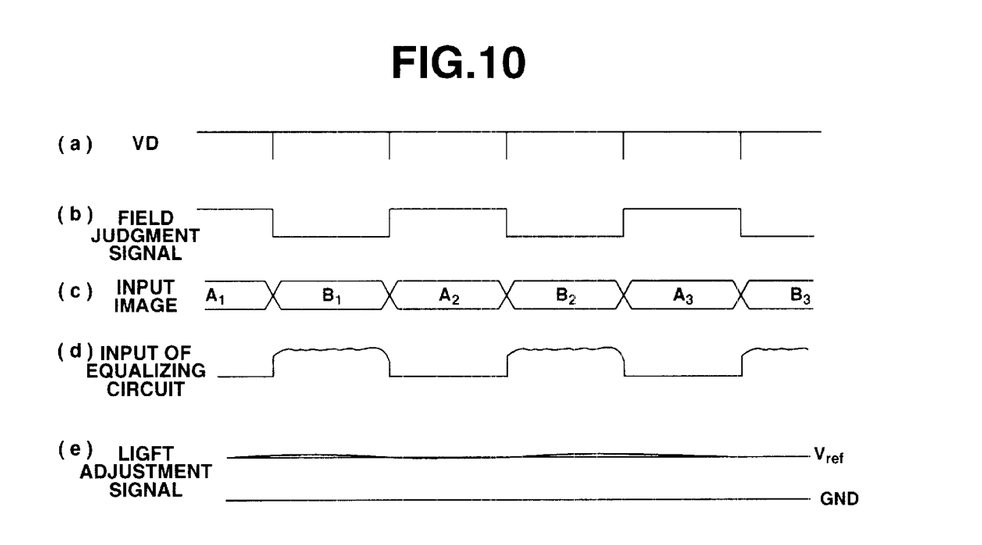
FIG. 10 is an explanatory diagram for explaining the operations of the waveform detecting circuit shown in FIG. 8.

FIGS. 8 to 10 relate to a second embodiment of the present invention. FIG. 8 is a diagram showing a configuration of an endoscopic apparatus. FIG. 9 is a diagram showing a configuration of the waveform detecting circuit shown in FIG. 8. FIG. 10 is an explanatory diagram for explaining the operations of the waveform detecting circuit shown in FIG. 9.

The second embodiment is nearly identical to the first embodiment. Only the differences will be described herein. The same reference numerals will be assigned to components which are identical to those of the first embodiment. The description of those components will therefore be omitted.

As shown in FIG. 8, in this embodiment, an output of the adding and averaging circuit 29 is input to a waveform detecting circuit 80. In the waveform detecting circuit 80, as shown in FIG. 9, a D/A converter 81 converts the output of the adding and averaging circuit 29 from a digital form to an analog form. The analog signal is sent to an equalizing circuit 83 via a switch 82 that is controlled by the CPU 35. The analog signal is equalized by the equalizing circuit 83. A difference voltage between the analog signal and a reference voltage Vref is amplified by an operational amplifier 84, and output as a light adjustment signal to the light adjusting circuit 57 in the light source unit 7.

The other components are identical to those of the first embodiment.

In this embodiment, as long as the dynamic range expansion on/off switch 34 is off, the switch 82 remains on under the control of the CPU 35. When the dynamic range expansion on/off switch 34 is turned on, the equalizing circuit 83 equalizes only a picture signal (FIG. 10d) representing the image of field B (FIG. 10c) according to a field judgment signal (FIG. 10b). Herein, the picture signal representing the image of field B has been produced at the second shutter speed (1/240 sec), and the field judgment signal is synchronous with a video signal VD (FIG. 10a) and output from the timing generator 14. This results in a light adjustment signal (FIG. 10e). The CPU turns on and off the switch 82 synchronously with the field judgment signal.

The other operations are identical to those of the first embodiment.

As mentioned above, the second embodiment provides the same advantages as those of the first embodiment. In addition, when the dynamic range expansion on/off switch 34 is turned on, a picture signal representing the image of field B and having been produced at a high shutter speed, for example, the second shutter speed (1/240 sec) is equalized. The equalized signal is used to produce a light adjustment signal to be input to the light adjusting circuit 57 in the light source unit 7. A picture signal produced at a low shutter speed, for example, the first shutter speed (1/60 sec), at which the picture signal may have a saturation value, will not be used to adjust light. Consequently, an endoscopic image of the interior of a body cavity can be projected without a halation effect at occuring ant point within the body cavity regardless of the distance from the distal end of the endoscope, because light can be adjusted highly precisely.

In the present invention, it is apparent that a wide range of different embodiments can be constructed based on the present disclosure of the invention without a departure from the spirit and scope of the invention. The present invention will therefore be limited by the appended claims but will not be restricted by the specific embodiments described herein.

What is claimed is:

1. An endoscopic apparatus, comprising:

an endoscope capable of being inserted into a body cavity and having an imaging device for imaging an object in the body cavity incorporated therein or mounted thereon;

a light source unit for supplying illumination light to said endoscope;

an amount-of-light control unit for controlling the amount of illumination light emanating from said light source unit;

a signal processing unit for processing an image signal sent from said imaging device in said endoscope, said signal processing unit including first and second weighting circuits for receiving a first image signal produced by imaging said object during a first exposure time, and a second image signal that is produced by imaging said object during a second exposure time shorter than the first exposure time and that has a saturation value relative to a higher light level than the first image signal, and for applying a first weight which decreases monotonously with an increase in light level up to a light level causing said first and second image signals to have the saturation value and a second weight that increases monotonously for the first and second image signals under the condition that the sum of the first and second weights is 1, and an adding circuit for adding first and second picture signals produced by applying the first and second weights to the first and second image signals by means of said first and second weighting circuits to thus expand a dynamic range; and a light adjustment signal producing unit for, when said signal processing unit expands a dynamic range, sending a light adjustment signal to said amount-of-light control unit to increase an amount of light which emanates from said light source unit and falls on said imaging device as compared with an amount of light emanating from said light source unit in a normal state.

2. An endoscopic apparatus, comprising:

an endoscope capable of being inserted into a body cavity and having an imaging device for imaging an object in the body cavity, incorporated therein or mounted thereon;

a light source unit for supplying illumination light to said endoscope;

an amount-of-light control unit for controlling the amount of illumination light emanating from said light source unit;

a signal processing unit for processing an image signal sent from said imaging device in said endoscope, said signal processing unit including first and second weighting circuits for receiving a first image signal produced by imaging said object during a first exposure time, and a second image signal that is produced by imaging said object during a second exposure time shorter than the first exposure time and that has a saturation value relative to a higher light level than the first image signal, and for applying a first weight which decreases monotonously with an increase in light level up to a light level causing said first and second imaging signals to have the saturation value and a second weight that increases monotonously for the first and second image signals under the condition that the sum of the first and second weights is about 1, and an adding circuit for adding first and second picture signals produced by applying the first and second weights to the first and second image signals by means of said first and second weighting circuits to thus expand a dynamic range; and a light adjustment signal producing unit for, when said signal processing unit expands a dynamic range, sending a light adjustment signal to said amount-of-light control unit to increase an amount of light which emanates from said light source unit and falls on said imaging device as compared with an amount of light emanating from said light source unit in a normal state.

3. An endoscopic apparatus according to claim 1, wherein said amount-of-light control unit is a diaphragm.

4. An endoscopic apparatus according to claim 2, wherein said amount-of-light control unit is a diaphragm.

5. An endoscopic apparatus according to claim 1, wherein when a dynamic range is expanded, said light adjustment signal producing unit produces the light adjustment signal according to the second image signal.

6. An endoscopic apparatus according to claim 2, wherein when a dynamic range is expanded, said light adjustment signal producing unit produces the light adjustment signal according to the second image signal.

* * * * *